United States Patent
Kostka et al.

(10) Patent No.: US 10,260,636 B2
(45) Date of Patent: Apr. 16, 2019

(54) THERMALLY RESPONSIVE CONTROLLED GAP SEAL DEVICE

(71) Applicant: PRATT & WHITNEY CANADA CORP., Longueuil (CA)

(72) Inventors: Richard A. Kostka, Bolton (CA); Dean Carpenter, Milton (CA); Tibor Urac, Mississauga (CA); Adam Logan, Hamilton (CA); Aaron Grey, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 299 days.

(21) Appl. No.: 15/066,463

(22) Filed: Mar. 10, 2016

(65) Prior Publication Data

US 2016/0186865 A1 Jun. 30, 2016

Related U.S. Application Data

(62) Division of application No. 13/456,356, filed on Apr. 26, 2012, now Pat. No. 9,309,975.

(51) Int. Cl.
| | |
|---|---|
| *F01D 11/00* | (2006.01) |
| *F01D 11/02* | (2006.01) |
| *F16J 15/16* | (2006.01) |
| *F16J 15/34* | (2006.01) |
| *F16J 15/44* | (2006.01) |

(52) U.S. Cl.
CPC .......... *F16J 15/445* (2013.01); *F01D 11/003* (2013.01); *F01D 11/025* (2013.01); *F16J 15/346* (2013.01); *F16J 15/443* (2013.01); *F01D 11/02* (2013.01); *F16J 15/164* (2013.01); *F16J 15/441* (2013.01); *Y10T 29/49716* (2015.01)

(58) Field of Classification Search
CPC ...... F16J 15/164; F16J 15/3568; F16J 15/441; F16J 15/445; Y10S 277/931; F01D 11/025
See application file for complete search history.

(56) References Cited

U.S. PATENT DOCUMENTS

| | | | |
|---|---|---|---|
| 2,888,286 A | 5/1959 | Scheffler, Jr. | |
| 2,917,329 A | 12/1959 | Laser | |
| 2,971,783 A | 2/1960 | Laser | |
| 2,937,039 A | 5/1960 | Santapa | |
| 2,948,555 A | 8/1960 | Wright | |
| 3,009,717 A | 11/1961 | Laser | |
| 3,333,855 A | 8/1967 | Andresen | |
| 3,389,916 A | 6/1968 | Wahl | |

(Continued)

*Primary Examiner* — Nicholas L Foster
(74) *Attorney, Agent, or Firm* — Norton Rose Fulbright Canada LLP

(57) ABSTRACT

A controlled gap seal device is adapted to surround a shaft with an annular seal element. A ring is positioned on an outer surface of the seal element, the ring adapted to modify a diametrical dimension of the seal element by thermally expanding/contracting as a function of temperature variations. A housing assembly has an interior enclosing the seal element and the ring, with the seal configured to be generally stationary in the interior. The housing assembly has an air inlet and air outlet in fluid communication with a surrounding environment for directing a flow of gas from the surrounding environment onto the ring to controllably cool and shrink the ring. A method for modifying a diameter of a controlled gap seal relative to the shaft is also provided.

4 Claims, 3 Drawing Sheets

(56) References Cited

U.S. PATENT DOCUMENTS

| | | | |
|---|---|---|---|
| 3,819,191 | A | 6/1974 | Voitik |
| 3,964,753 | A * | 6/1976 | Junker .................... F16J 15/30 |
| | | | 277/350 |
| 4,754,983 | A | 7/1988 | Kruger |
| 5,014,999 | A | 5/1991 | Makhobey |
| 5,127,793 | A | 7/1992 | Walker et al. |
| 5,527,045 | A | 6/1996 | Pondelick |
| 5,593,165 | A | 1/1997 | Murray et al. |
| 7,175,388 | B2 | 2/2007 | Labbe et al. |
| 7,905,495 | B2 | 3/2011 | Munson |
| 2006/0033287 | A1 | 2/2006 | Rago |
| 2006/0239816 | A1 * | 10/2006 | Labbe ................... F01D 11/003 |
| | | | 415/230 |
| 2008/0237995 | A1 | 10/2008 | Khonsari et al. |

* cited by examiner

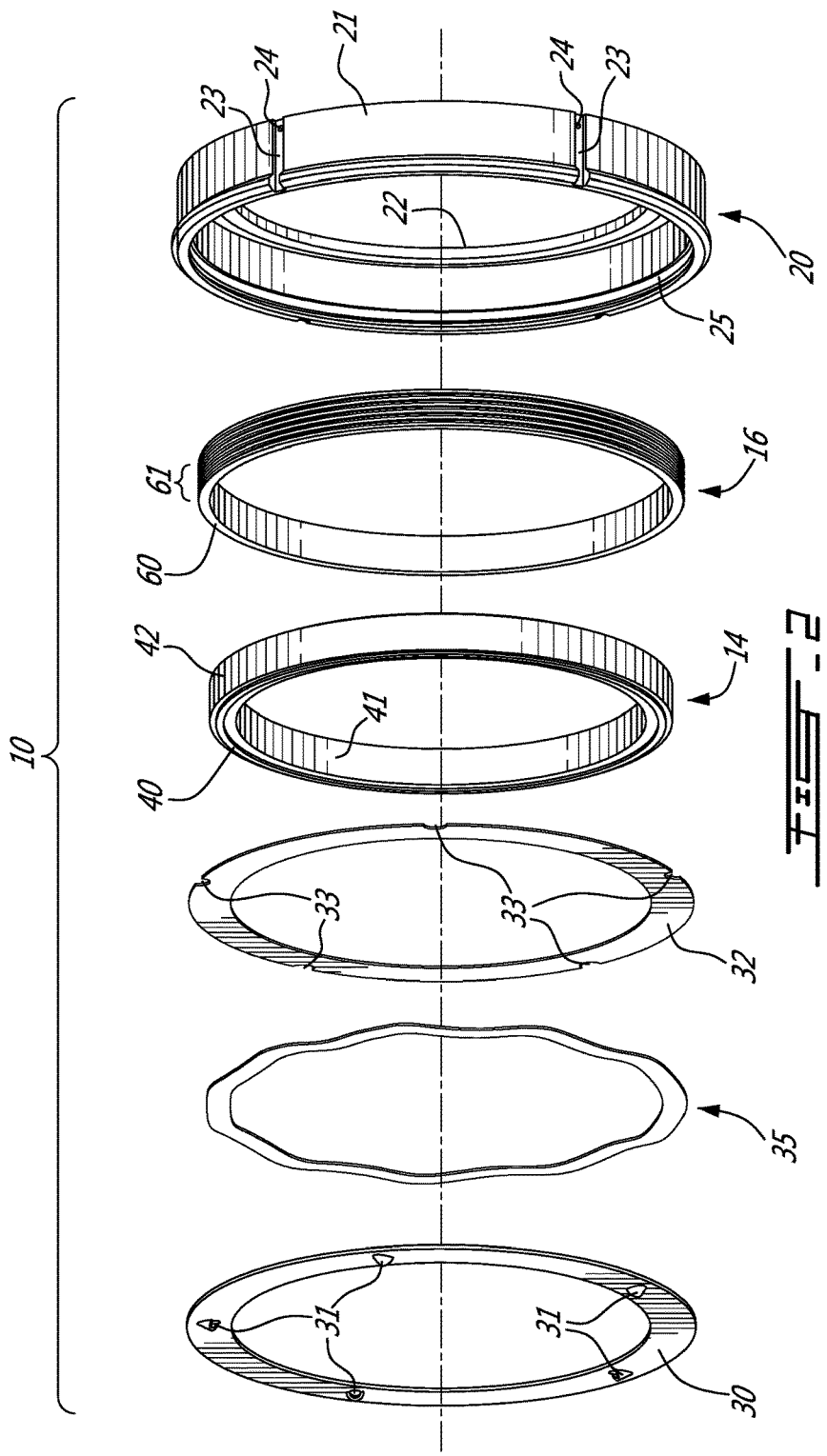

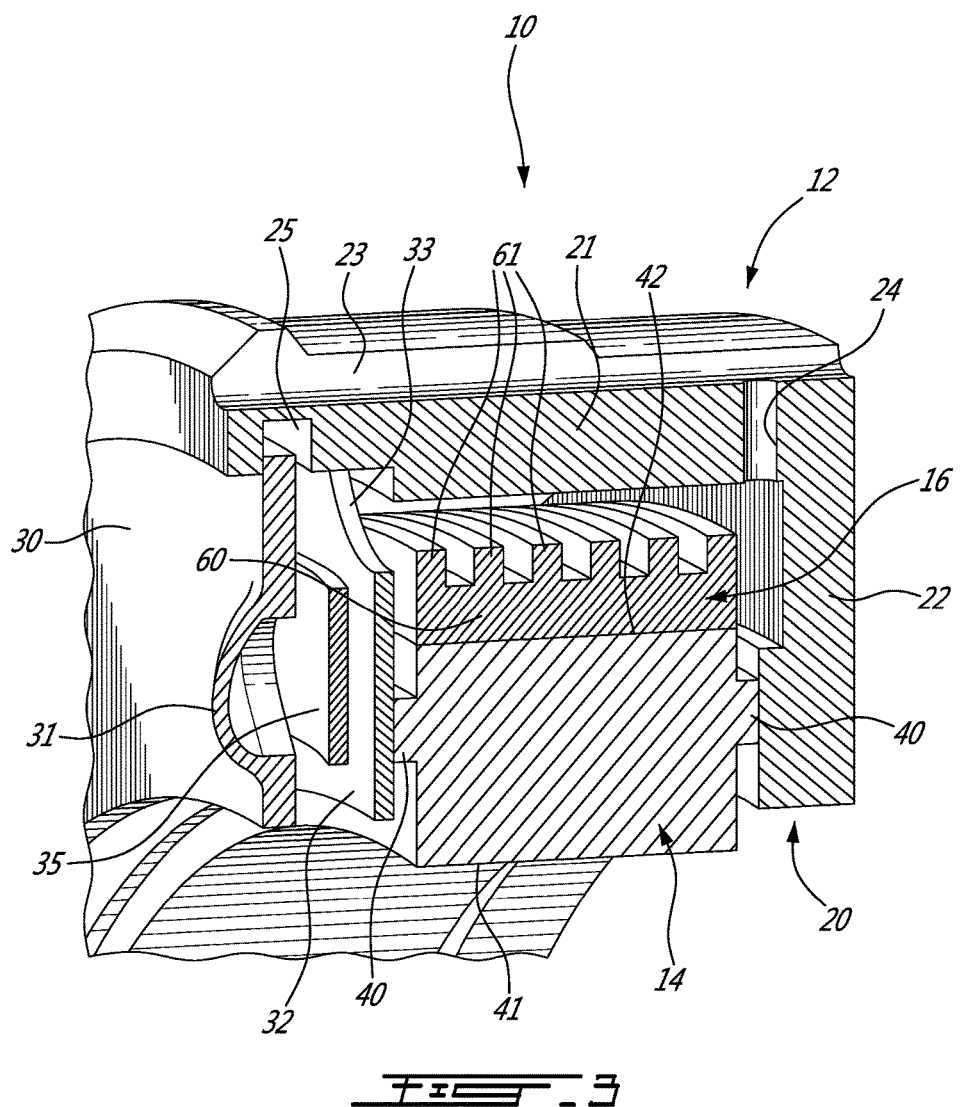

THERMALLY RESPONSIVE CONTROLLED GAP SEAL DEVICE

TECHNICAL FIELD

The present application relates to gas turbine engines, and more particularly to controlled gap seals used in gas turbine engines.

BACKGROUND OF THE ART

Controlled gap seals, such as carbon controlled gap seals, are commonly used in gas turbine engines, generally to seal bearing compartments. These seals are designed to run with a few thousands of an inch of clearance between a stationary carbon element and a rotating seal runner or shaft. As the temperature of the bearing area heats and cools, the seal is designed to react to temperature variations and keep the seal clearance or gap relatively constant. This may be done by having a shrink band on the carbon element. The shrink band is a metal ring that is in a tight-fitting engagement onto the carbon element. The shrink band is heated and cooled by the surrounding air, thus controlling the expansion and contraction of the carbon element. In some transient temperature excursions, the shrink band may not be sufficiently responsive as it may not be directly exposed to surrounding air. This may cause seal rub that may eventually lead to increased leakage during steady-state running of the gas turbine engine.

Accordingly, there is a need to provide an improved thermally responsive controlled gap device.

SUMMARY

In one aspect, there is provided a controlled gap seal device adapted to surround a shaft, the device comprising: an annular seal element; a ring positioned on an outer surface of the seal element, the ring adapted to modify a diametrical dimension of the seal element by thermally expanding/contracting as a function of temperature variations; and a housing assembly having an interior enclosing the seal element and the ring, with the seal configured to be generally stationary in the interior, the housing assembly having at least one air inlet and at least one air outlet in fluid communication with a surrounding environment for directing a flow of gas from the surrounding environment onto the ring to controllably cool and shrink the ring.

In a second aspect, there is provided a method for modifying a diameter of a controlled gap seal relative to the shaft, comprising: inletting air/gases from a surrounding environment into a housing assembly enclosing a seal element; exposing a ring positioned on the seal element to the air/gases in the housing assembly to modify a diameter of the seal element by thermally expanding/contracting as a function of a temperature of the air/gases; and outletting the air/gases to the surrounding environment.

Further details of these and other aspects of the present invention will be apparent from the detailed description and figures included below.

DESCRIPTION OF THE DRAWINGS

Reference is now made to the accompanying figures, in which:

FIG. 2 is an exploded view of the thermally responsive controlled gap device of FIG. 1; and FIG. 3 is a sectional perspective view of the thermally responsive controlled gap device of FIG. 1.

DETAILED DESCRIPTION OF THE PREFERRED EMBODIMENTS

Figure 1:
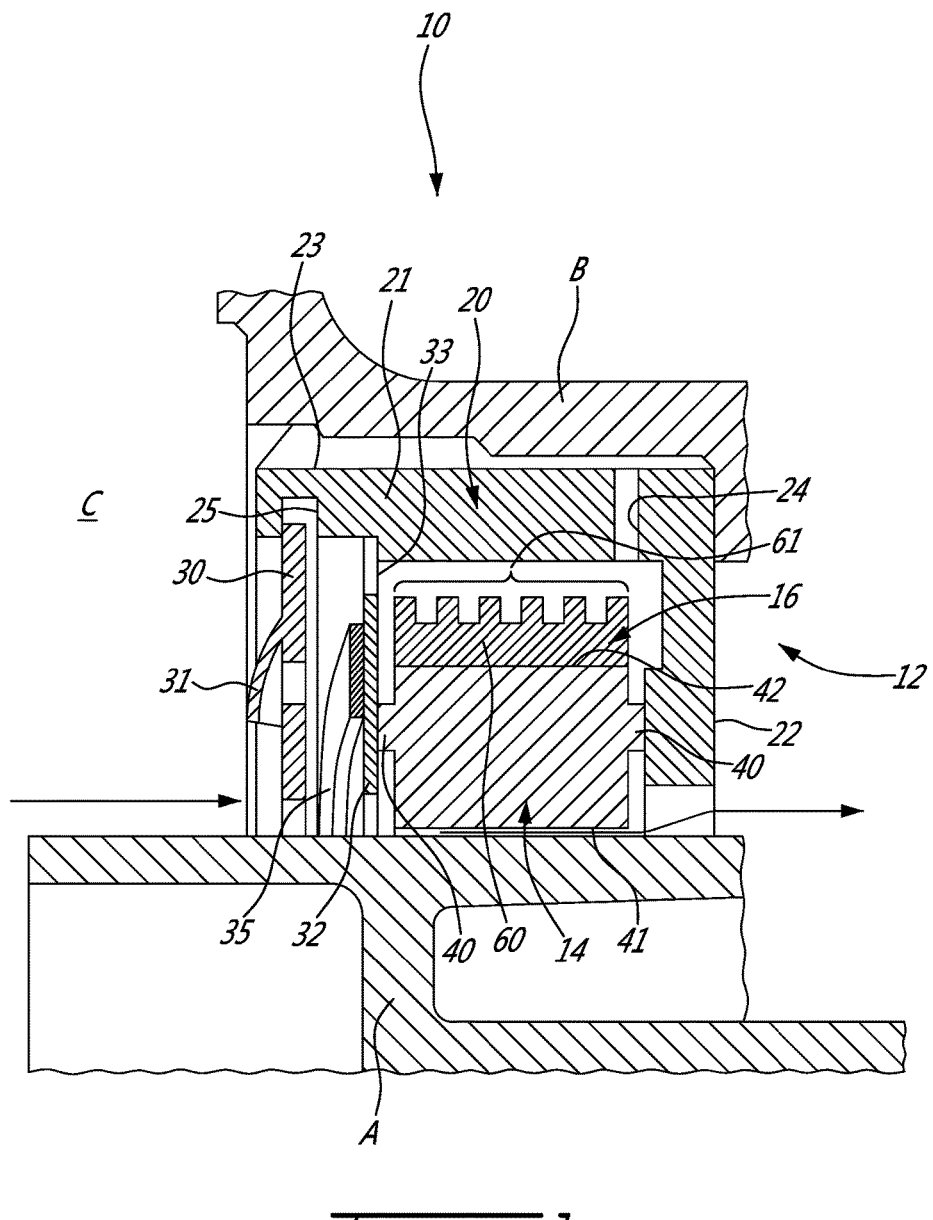
FIG. 1 is a sectional view of a thermally responsive controlled gap seal device in accordance with the present disclosure.

Referring to FIGS. 1 to 3, there is illustrated a thermally responsive controlled gap seal device 10 in accordance with the present disclosure. The thermally responsive controlled gap seal device 10 is used between a shaft and a structural component, such as seal runner A and bearing housing B. According to an embodiment, the thermally responsive controlled gap seal device 10 may be adjacent to a bearing (part of which is the bearing housing B) supporting the seal runner A, with the seal runner A rotating about its longitudinal axis. The thermally responsive controlled gap seal device 10 is positioned about the seal runner A to reduce the amount of air/gases reaching the bearing. A gap is defined between the thermally responsive controlled gap seal device 10, such that the thermally responsive controlled gap seal device 10 generally remains stationary while the shaft rotates.

The thermally responsive controlled gap seal device 10 may have a housing assembly 12, a seal 14 and a shrink band 16.

The housing assembly 12 interfaces the thermally responsive controlled gap seal device 10 to the bearing housing B, or to any other structural component.

The seal 14 performs the sealing between the thermally responsive controlled gap seal device 10 and its supporting structure (e.g., bearing housing B), and the seal runner A, or other shaft or rotating component. The seal 14 is made of carbon, or any other appropriate sealing materials.

The shrink band 16 is a ring that surrounds the seal 14 and reacts to temperature changes to modify diametrical dimensions of the seal 14, by expanding/contracting thermally.

The housing assembly 12 is shown comprising a housing body 20. The housing body 20 is typically cup-shaped and therefore comprises an outer annular wall 21 and a radial end wall 22. The outer wall 21 is sized so as to be received in an appropriate cavity in the bearing housing B (e.g., force fit, interference fit, etc). The radial end wall 22 defines one of the radial ends of the thermally responsive controlled gap seal device 10. Therefore, the outer wall 21 and the radial end wall 22 concurrently form an annular cavity of the housing body 20.

One or more axial channels 23 (i.e., slots) are defined in an outer surface of the outer wall 21. The axial channels 23 are in fluid communication with a space C adjacent to the bearing housing B. Alternatively, the outer wall 21 may be continuous, with axial channels being defined in the bearing housing B. Moreover, air passages 24 are defined in the housing body 20 (e.g., in the outer wall in FIGS. 1 to 3) and are in fluid communication with an interior of the housing body 20 and with the axial channels 23, whereby air may flow out of the annular cavity of the housing body 20, through the air passages 24, the axial channels 23 and out to the space C.

In an end opposed to the radial end wall 22, an annular channel 25 may be defined in an inner surface of the outer wall 21. The annular channel 25 is sized so as to receive an outer washer 30, and hold it captive. The outer washer 30 closes the housing body 20 to encapsulate various components therein. The outer washer 30 could be connected to the housing body 20 in other ways, such as being threadingly engaged to the housing body 20, etc. Air scoops 31 or like air inlets are circumferentially disposed at various locations on the outer washer 30. The air scoops 31 will direct surrounding swirling air from an exterior of the housing assembly 12 to an interior thereof. The air scoops 31 may project into the environment C.

An inner washer 32 is within the housing body 20 and in contact with the seal 14. The inner washer 32 also comprises air passages 33. In the illustrated embodiment, the air passages 33 are cutouts in the outer peripheral edge of the inner washer 32. The cutouts 33 may have a semi-circular shape, although other configurations are considered as well.

A spring 35 (such as a wave spring) is positioned between the outer washer 30 and the inner washer 32 and therefore presses the inner washer 32 against the seal 14. Other biasing means could be used as alternatives to the wave spring 35, such as coil springs, leaf springs, etc. In an embodiment, the spring 35 is directly in contact with the seal 14.

The seal 14 may have abutments 40 projecting in opposed axial directions. According to an embodiment, the abutments 40 are annular. The abutments 40 will be in contact with the inner washer 32 and the radial end wall 22, respectively. Therefore, the biasing force of the spring 35 will axially load the seal 14 against the radial end wall 22, thereby maintaining its position within the housing body 20. The seal 14 may be without such abutments 40, and instead have its radial surfaces directly in contact with the spring 35 and the radial end wall 22. In yet another embodiment, the seal 14 is directly in contact with the outer washer 30, with the outer washer 30 effecting the axial loading of the seal 14 against the radial end wall 22. In yet another embodiment, the spring 35 is between the radial end wall 22 and the seal 14.

The seal 14 has an inner diameter 41 that is sized to be slightly greater than an outer diameter of the seal runner A, so as to define the gap therebetween. An outer diameter 42 of the seal 14 is sized so as to receive thereon the shrink band 16. The shrink band 16 has an annular body 60 that is made of material with a coefficient of thermal expansion proportional to an expansion of the shaft (i.e., the seal runner A in the illustrated embodiment). For instance, the shrink band 16 is metallic ring, that it in a tight-fitting engagement on the seal 14. The outer surface of the annular body 60 may have heat transfer fins 61 projecting radially outwardly therefrom, to increase a surface of the shrink band 16 that is exposed to thermal conditioning air. By the presence of the heat transfer fins 61 and the exposure of the shrink band 16 to air/gases circulating within the housing body 20, the shrink band 16 will react to temperature changes and will cause a pressure on the seal 14 proportional to a variation in diameter of the seal runner A. Hence, the seal 14 adjusts its size as a function of temperature variations in the gas turbine engine.

In operation, air/gases in the environment C will penetrate the thermally responsive controlled gap seal device 10 via the air passages 31 of the outer washer 30. In an embodiment, the air/gases are in a turbulent condition (e.g., swirling), whereby the air scoops 31 may increase the amount of air/gases entering the housing body 20. The air scoops 31 may be oriented/aligned with flow direction to collect more air/gases. The resulting pressure increase in the housing body 20 causes a flow of the air/gases through the air passages 33 of the inner washer 32, to the air passages 24, thereby flowing over and across the shrink band 16. The air/gases sucked by the air passages 24 will return to the environment C via the air channels 23—the air channels 23 and air passages 24 forming outlets. The flow of air/gases in the housing assembly 12 will expose the shrink band 16 to temperatures generally equivalent to that to which the seal runner A is exposed. Hence, the shrink band 16 will exert/release pressure on the seal 14, to maintain the gap between the seal 14 and the seal runner A The presence of air scoops 31 (and their number), as well as the heat transfer fins 61 may reduce the reaction time of the shrink band 16 to temperature variations.

It is observed that the combination of inner washer 32, spring 35 and abutments 40 generally prevent air/gases leakage of the thermally responsive controlled gap seal device 10, other than through the air channels 23 and air passages 24.

The above description is meant to be exemplary only, and one skilled in the art will recognize that changes may be made to the embodiments described without departing from the scope of the invention disclosed. For example, the thermally responsive controlled gap seal device 10 may be used in different applications in addition to gas turbine engines. Controlled gap seals using materials besides carbon may have the present teachings applied, as well. Still other modifications which fall within the scope of the present invention will be apparent to those skilled in the art, in light of a review of this disclosure, and such modifications are intended to fall within the appended claims.

What is claimed is:

1. A method for modifying a diameter of a controlled gap seal relative to a shaft, comprising:
   inletting and receiving air or gases from a first cavity into a housing assembly enclosing a seal element, the first cavity axially separated from a second cavity by the controlled gap seal;
   directing a first portion of the received air or gases in a chamber via a first passage,
   directing a second portion of the received air or gases in a gap defined between the controlled gap seal and the shaft, and outletting the second portion of the received air or gases in the second cavity, the seal element located between the gap and the chamber;
   exposing a ring, positioned on the seal element inside the chamber, to the first portion of the received air or gases received in the chamber via the first passage to modify a diameter of the seal element by thermally expanding or contracting the ring as a function of a temperature of the first portion of the received air or gases to which the ring is exposed; and
   outletting the first portion of the received air or gases from the chamber and back to the first cavity via a second passage distinct from the first passage, the outletting of the first portion of the received air or gases being on a same axial side of the controlled gap seal as the inletting of the first portion of the received air or gases.

2. The method according to claim 1, wherein the inletting of the air or gases comprises scooping air or gases from an airflow in the first cavity into the first passage.

3. The method according to claim 1, wherein the exposing of the ring comprises exposing heat transfer fins on the ring to the first portion of the received air or gases.

4. The method according to claim 1, further comprising axially loading the seal element to a sealing position.

* * * * *